United States Patent [19]
Sakuma et al.

[11] Patent Number: 5,799,045
[45] Date of Patent: Aug. 25, 1998

[54] PLL-MODE RADIOFREQUENCY MODULE

[75] Inventors: Susumu Sakuma; Masahiro Tanaka, both of Mobara, Japan

[73] Assignee: Futaba Denshi Kogyo K.K., Mobara, Japan

[21] Appl. No.: 576,906

[22] Filed: Dec. 22, 1995

[30] Foreign Application Priority Data

Dec. 22, 1994 [JP] Japan .................. 6-335419

[51] Int. Cl.$^6$ .................................................. H03C 3/00
[52] U.S. Cl. .................................. 375/303; 375/376
[58] Field of Search ........................... 375/239, 303, 375/376; 455/349; 331/16, 17, DIG. 2; 332/100

[56] References Cited

U.S. PATENT DOCUMENTS

| | | | |
|---|---|---|---|
| 3,562,671 | 2/1971 | Honma et al. | 375/239 |
| 3,858,116 | 12/1974 | Friedl et al. | 455/349 |
| 4,177,426 | 12/1979 | Gaishin et al. | 455/349 |
| 4,368,439 | 1/1983 | Shibuya et al. | 375/303 |
| 5,412,353 | 5/1995 | Chaplik et al. | 375/303 |

*Primary Examiner*—Stephen Chin
*Assistant Examiner*—Joseph Roundtree
*Attorney, Agent, or Firm*—Oblon, Spivak, McClelland, Maier & Neustadt, P.C.

[57] ABSTRACT

A PLL-mode radiofrequency module capable of being connected to a transmitter of any kind. The PLL-mode module is provided therein with a CPU, which functions to vary a waveform of a PPM signal fed thereto from a transmitter body so as to permit a pulse duty ratio of the PPM signal to be about 50%. The PPM signal thus varied is fed to a modulation circuit and then subjected to FSK modulation, so that a PLL oscillator constituted by a PLL circuit and a modulation circuit or voltage control oscillator generates a frequency as indicated by a rotary switch. A carrier frequency controller thus constructed is arranged on a side of the PLL-mode radiofrequency module rather than the transmitter body, so that the PLL-mode radiofrequency module may be connected to a transmitter of any kind.

2 Claims, 10 Drawing Sheets

FIG.8
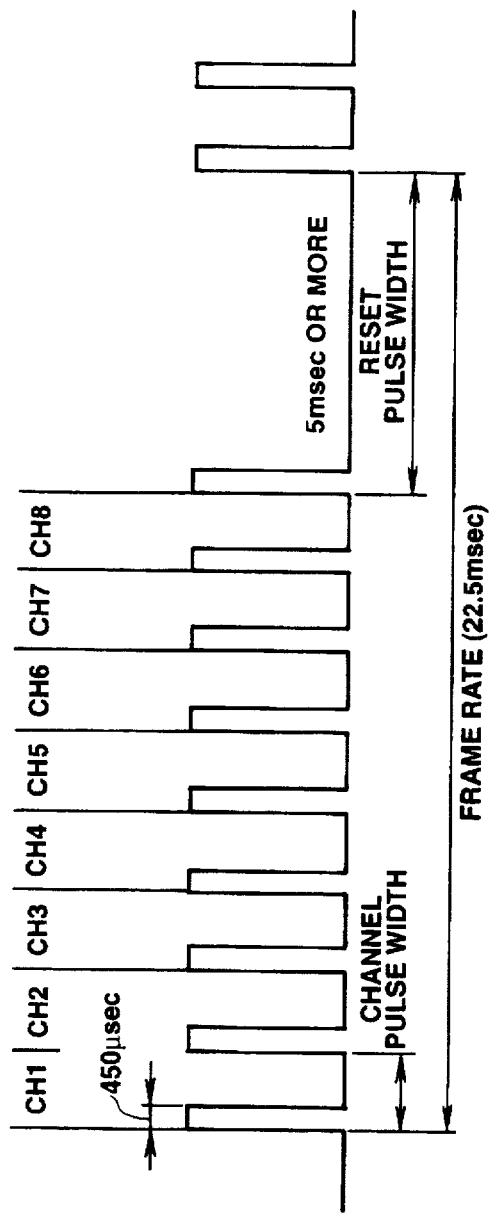
(A)
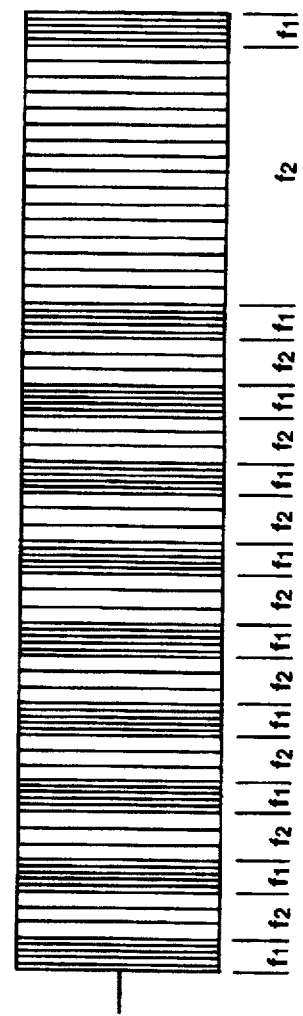
(B)

5,799,045

1

PLL-MODE RADIOFREQUENCY MODULE

BACKGROUND OF THE INVENTION

This invention relates to a PLL-mode radiofrequency module adapted to feed a radiofrequency signal to a transmitter and detachably mounted therein with a PLL oscillator, and more particularly to a PLL-mode radiofrequency module suitable for use for a radio control transmitter wherein a radiofrequency signal output from a PLL oscillator is converted into a carrier by FSK modulation.

A conventional radio control transmitter is generally constructed in such a manner as shown in FIG. 2. More particularly, the conventional radio control transmitter includes a transmitter body 1 which is formed on a rear surface thereof with a receiving section of a recess-like shape and a radiofrequency (RF) module 2 detachably arranged in the receiving section.

The radiofrequency module 2 has a radiofrequency circuit for determining a frequency of a carrier and a mode of modulation thereof incorporated in the form of a module therein. A modulation signal which takes the form of a PPM (pulse position modulation) signal or a PCM (pulse code modulation) signal depending on the amount of operation of a control element such as a stick or the like is fed from the transmitter body 1 to the radiofrequency module 2, to thereby modulate a carrier of a frequency designated which is generated in the radiofrequency module 2.

In the radio control transmitter thus constructed, a frequency (frequency band) of a carrier allowed is independently determined depending on the county, resulting in being generally varied for every country. In view of the fact, an approach wherein a frequency band of a carrier transmitted from the transmitter or a frequency thereof is varied by exchanging the radiofrequency module 2 or varying a mode of the radiofrequency module 2 that, resulting in the radio control transmitter being serviceable in all countries.

The radiofrequency module 2 may be in the form of a crystal-mode radiofrequency module which is adapted to vary a frequency band of a carrier by exchanging a radiofrequency module. The crystal-mode radiofrequency module 2 includes a detachable crystal oscillator, wherein a plurality of crystals different in oscillation frequency are exchanged with each other as required, to thereby permit various carriers different in frequency to be selectively transmitted.

Alternatively, the radiofrequency module 2 may be in the form of a PLL-mode radiofrequency module, which is adapted to permit a frequency of a carrier to be varied by varying a mode of the module. The PLL-mode radiofrequency module 2 is provided therein with a PLL oscillator, so that carriers different in frequency may be selectively transmitted by varying a mode of a frequency depending on a command from the transmitter body 1.

Thus, when the radiofrequency module 2 is equipped with the PLL oscillator, it is conveniently used because it can solely oscillate various frequencies. However, some countries do not permit use of the module thus equipped with the PLL oscillator for the radio control transmitter; therefore, in the countries, it is required to use the radiofrequency module equipped with the crystal oscillator.

Thus, the radiofrequency module 2 is classified into two types as described above, therefore, the transmitter body 1 is constructed so as to permit the two types to be selectively mounted thereof.

More particularly, the crystal-mode radiofrequency module having the crystal oscillator incorporated therein is constructed in such a manner as shown in FIGS. 3(a) and 3(b), whereas the PLL-mode radiofrequency module having the PLL oscillator incorporated therein, as shown in FIGS. 4(a) and 4(b), is so constructed that a longitudinal length thereof is identical with a lateral length thereof.

The crystal-mode radiofrequency module 2, as shown in FIGS. 3(a) and 3(b), includes an RF module body 20, which is formed on each of upper and lower surfaces thereof with a holding element 21, which is securely engaged with the transmitter body 1 when the module 2 is mounted on the transmitter body 1. Also, the module 2 is provided on a rear surface thereof or a surface thereof facing the transmitter body 1 when it is mounted on the transmitter body 1 with a connector on a side of the RF module which is connected to a connector on a side of the transmitter body 1. Further, the RF module body 20 is provided therein with an RF substrate having a crystal oscillator incorporated therein.

The PLL-mode radiofrequency (RF) module 2, as shown in FIGS. 4(a) and 4(b), includes an RF module body 20, which are formed on each of upper and lower surfaces thereof with a holding element 21, which is securely engaged with the transmitter body 1 when the module 2 is mounted on the transmitter body 1. Also, the module 2 is provided on a rear surface thereof or a surface thereof facing the transmitter body 1 when it is mounted on the transmitter body 1 with a projection 22. The projection 22 is provided with two sets of connectors on a side of the PLL-mode RF module 2 which are connected to connectors on a side of the transmitter body 1.

Mounting of the PLL-mode radiofrequency module 2 on the transmitter body 1 is shown in FIG. 5(a) and mounting of the crystal-mode radiofrequency module 2 on the transmitter body 1 is shown in FIG. 5(b).

Mounting of the crystal-mode radiofrequency module 2 on the transmitter body 1, as shown in FIG. 5(b), causes the RF module body 20 to be inserted into a receiving section 33 of a recess-like shape formed on a transmitter casing 30 until it is abutted against a step 31 formed in the receiving section 33. This results in leads which extend from a first RF module side connector 25 provided on an RF substrate 24 arranged in the RF module body 20 being inserted into a first transmitter side connector 32, to thereby establish electrical connection between both connectors 25 and 32. Also, the transmitter body 1 is provided with a second transmitter side connector 34, which is connected to nothing.

Mounting of the PLL-mode radiofrequency module in a casing 30 of the transmitter which is shown in FIG. 5(a) causes the RF module body 20 to be inserted into a receiving section 33 of a recess-like shape formed on the transmitter body 1 until an engagement 23 formed on the RF module body 20 is abutted against a step 31 formed in the receiving section 33. This results in leads which extend from a first RF module side connector 25 provided on an RF substrate 24 arranged in the RF module body 20 being inserted into a first transmitter side connector 32, to thereby establish electrical connection between both connectors 25 and 32, as well as a second RF module side connector 27 provided on a PLL substrate 26 arranged in the projection 22 being inserted into a second transmitter side connector 34 provided on the transmitter body 1, to thereby establish connection therebetween.

Modulation of the PLL oscillator by a PPM signal causes a frequency of a carrier generated from the PLL oscillator to be shifted. Now, such a phenomenon will be described hereinafter.

FIG. 7 shows a group of formats of a PPM signal obtained when the radio control transmitter is constructed into a eight-channel structure. (A) of FIG. 7 indicates a PPM signal obtained when a control element provided on the radio control transmitter such as a stick or the like is at a neutral position.

In a system wherein the amount of operation of the control element is transmitted by means of a PPM signal, the amount of operation in each of channels CH1 to CH8 shown in (A) of FIG. 7 is transmitted by varying a width of the channel. (B) of FIG. 7 indicates that the control element such as a stick or the like in each of the eight channels is operated to the maximum limit to cause a channel pulse width to be reduced to the utmost limit. On the contrary, the channel pulse width is increased to the maximum limit, about three quarters of a frame rate width is occupied by channel pulses of the eight channels.

Also, FIG. 8 shows a group of formats of a PPM signal, wherein a level of a pulse is reversed. As shown in (A) of FIG. 8, a frame rate is set to be 22.5 msec, a pulse width of a pulse indicating rising of each of channel pulse widths is set to be 450 μsec. Also, a reset pulse width subsequent to the channel pulse width of the channel CH8 is set to be 5 msec. Further, the channel pulse width is set to be 1520±600 μsec.

Such a PPM signal causes a carrier to be subjected to FSK modulation, which is shown in (B) of FIG. 8. (B) of FIG. 8 indicates that when the PPM signal is at a high level, a carrier is shifted, resulting in a frequency thereof being f1; whereas when it is at a low level, the carrier has a frequency shifted to f2.

The amount of shift of the carrier may be −1.5 kHz at the frequency f1 and +1.5 kHz at the frequency f2.

When the FSK modulation is carried out by applying the PPM signal to a voltage control oscillator constituting the PLL oscillator, the PLL oscillator is so controlled that a frequency thereof is constantly kept constant by a control loop, resulting in a frequency of a carrier outputted from the PLL oscillator being shifted.

When a pulse duty ratio of the PPM signal is about 16% as shown in (A) of FIG. 9, and a central frequency Fo of the carrier and a transition frequency of the FSK modulation or a depth of the modulation are 72.79 MHz and ±1.5 kHz as indicated at A in FIG. 10, respectively; the above-described shift is so carried out that the central frequency Fo of the carrier is increased by about 1 kHz. (B) of FIG. 8 indicates a situation wherein the central frequency of the carrier is not shifted and FIG. 10 shows spectra of the carrier.

Thus, shift of the central frequency Fo of the carrier by FSK modulation causes deterioration in sensitivity of receiving of the radio control receiver or radio interference, leading to a failure in proper remote control, because separation of a channel frequency of the radio control transmitter is decreased.

An approach to the problem is proposed for preventing FSK modulation from shifting the central frequency of the carrier, as disclosed in Japanese Utility Model Application Laid-Open Publication No. 9698/1994. More particularly, in the approach, FSK modulation is carried out while converting a PPM signal of which a pulse duty ratio is about 16% apart from 50% as shown in (A) of FIG. 9 into a PPM signal of which a pulse duty ratio is 50% as shown in (B) of FIG. 9, to thereby prevent shift of the central frequency of the carrier as indicated at B in FIG. 10. In the approach, the number of channels of a control element is set to be seven.

A radio control transmitter in which such an approach is practiced will be described hereinafter with reference to FIG. 6. The radio control transmitter generally designated at reference numeral 100 in FIG. 6 includes a microprocessor (CPU) 101, which functions to set indicated frequency information in a PLL circuit 102, to thereby permit a PLL oscillator comprising the PLL circuit 102 and a modulation circuit 103 to output a carrier of a predetermined frequency.

The modulation circuit 103 comprises a voltage control oscillator. The PLL circuit 102 comprises a frequency divider in which frequency information fed thereto is set, a reference frequency generating means, a phase comparison means for comparing a phase of a frequency outputted from the frequency divider and that of a reference frequency, and a low-pass filter for filtering an output of the phase comparison means to provide an error voltage.

Also, the CPU 101 functions to control a PPM signal output circuit 104 for generating a PPM signal comprising channel pulses of a plurality of channels, resulting in a PPM signal of which a pulse duty ratio is defined to be 50% irrespective of each of channel pulse widths being generated therefrom.

The PPM signal having a pulse duty ratio thus determined to be 50% is then applied to the modulation circuit 103, so that the carrier is subjected to FSK modulation and then transmitted from an antenna 105. The PLL circuit 102 and modulation circuit 103 may cooperate with each other to provide a detachable radiofrequency module 2.

Operation expressions by which the CPU 101 converts the PPM signal shown in (A) of FIG. 9 into the PPM signal of which a pulse duty ratio is set to be 50% as shown in (B) of FIG. 9 are as follows:

$$T2' = 460 + ((T4-920) \times 890)/1200 \quad (1)$$

$$(T4-T2') = 460 + ((T4-920) \times 310)/1200 \quad (2)$$

$$T2a = 450 + (10800 - SUM(T2')) \quad (3)$$

$$T3' = 5090 + (6160 - SUM(T4-T2')) \quad (4)$$

wherein T2 indicates a one-shot pulse width prior to the conversion, T2' is a one-shot pulse width after the conversion, T2a is a pulse width of a final pulse after the conversion, T3 is a low level width of a reset pulse prior to the conversion, T3' is a low level width of a reset pulse after the conversion and T4 is a channel pulse width, as shown in FIG. 9. Also, SUM(T2') is a sum of periods of T2', SUM (T4−T2') is a sum of periods of (T4−T2'). A unit of each of the expressions (1) to (4) is μsec.

Operation of the expressions (1) to (4) causes the pulse width (T2') of the one-shot pulse to be increased from 450 μsec to 905 μsec and the pulse width (T2a) of the final pulse to be increased from 450 μsec to 4915 μsec, as well as the low level width (T3') of the resent pulse to be reduced from 11410 μsec to 6945 μsec, resulting in a pulse duty ratio of the PPM signal being 50%.

The above-described expressions are prepared to satisfy requirements of a radio control transmitter that a frame rate is 22.5 msec, a channel pulse width is 1520±600 usec, a reset pulse width is 5 msec or more, and a one-shot pulse width is 450 μsec or more.

In the crystal-mode radiofrequency module, FSK modulation by means of such a PPM signal as shown in (A) of FIG. 9 of which a pulse duty ratio is not 50% does not cause shift of a central frequency of a carrier. Thus, in the prior art, shift of an output waveform of the PPM signal is carried out by selective mounting of the PLL-mode radiofrequency module or crystal-mode radiofrequency module on the transmitter body. Unfortunately, this causes a charge to a software of the microprocessor for controlling an output waveform of the PPM signal to be increased, resulting in the microprocessor failing to satisfactorily exhibit its inherent function.

SUMMARY OF THE INVENTION

The present invention has been made in view of the foregoing disadvantage of the prior art.

Accordingly, it is an object of the present invention to provide a PLL-mode radiofrequency module which is capable of being connected to a transmitter body which is not provided with a processing means for controlling a PPM signal so as to permit a pulse duty ratio of the PPM signal to be about 50% as well.

In accordance with the present invention, a PLL-mode radiofrequency module including a PLL oscillator which is adapted to feed a transmitter body of a transmitter with a radiofrequency signal and detachably mounted on the transmitter body is provided. The PLL-mode radiofrequency module includes a PLL circuit and a modulation means in which an oscillation frequency is controlled by an error voltage generated from the PLL circuit. The PLL circuit and modulation means are connected to each other in a loop-like manner to provide the PLL oscillator. The PLL-mode radiofrequency module also includes a frequency indication means for indicating a frequency of a carrier oscillated by the PLL oscillator and a processing means for receiving an indication of a frequency from the frequency indication means to set frequency information in the PLL circuit. The processing means is fed with a PPM signal as a modulation signal from the transmitter body, to thereby make correction on the PPM signal so that a pulse duty ratio of the PPM signal is about 50% and then apply it to the modulation means, resulting in the carrier generated from the PLL oscillator being subjected to FSK modulation by means of the PPM signal corrected.

In a preferred embodiment of the present invention, the modulation means comprises a voltage control oscillator.

As described above, the present invention is so constructed that the processing means or microprocessor for controlling a PPM signal so as to vary a pulse duty ratio of the signal to about 50% is arranged on a side of the PLL-mode radiofrequency module. Such construction eliminates a necessity of varying an output waveform of the PPM signal depending on arrangement of the PLL-mode radiofrequency module or crystal-mode radiofrequency module on a side of the transmitter body. This permits a change to a software of the microprocessor for controlling an output waveform of the PPM signal to be lightened, resulting in the microprocessor satisfactorily exhibiting a function thereof.

Also, the present invention permits the PLL-mode radiofrequency module to be connected to transmitter body, even when the processing means for controlling a PPM signal so as to permit a pulse duty ratio of the PPM signal to be about 50% is not provided on the transmitter body. Thus, the PLL-mode radiofrequency module can be generally connected to a transmitter of any type.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 8 is a group of waveform diagrams each showing FSK modulation by means of a PPM signal;

DETAILED DESCRIPTION OF THE PREFERRED EMBODIMENT

Now, a PLL-mode radiofrequency module according to the present invention will be described hereinafter with reference to the accompanying drawings.

Figure 1:
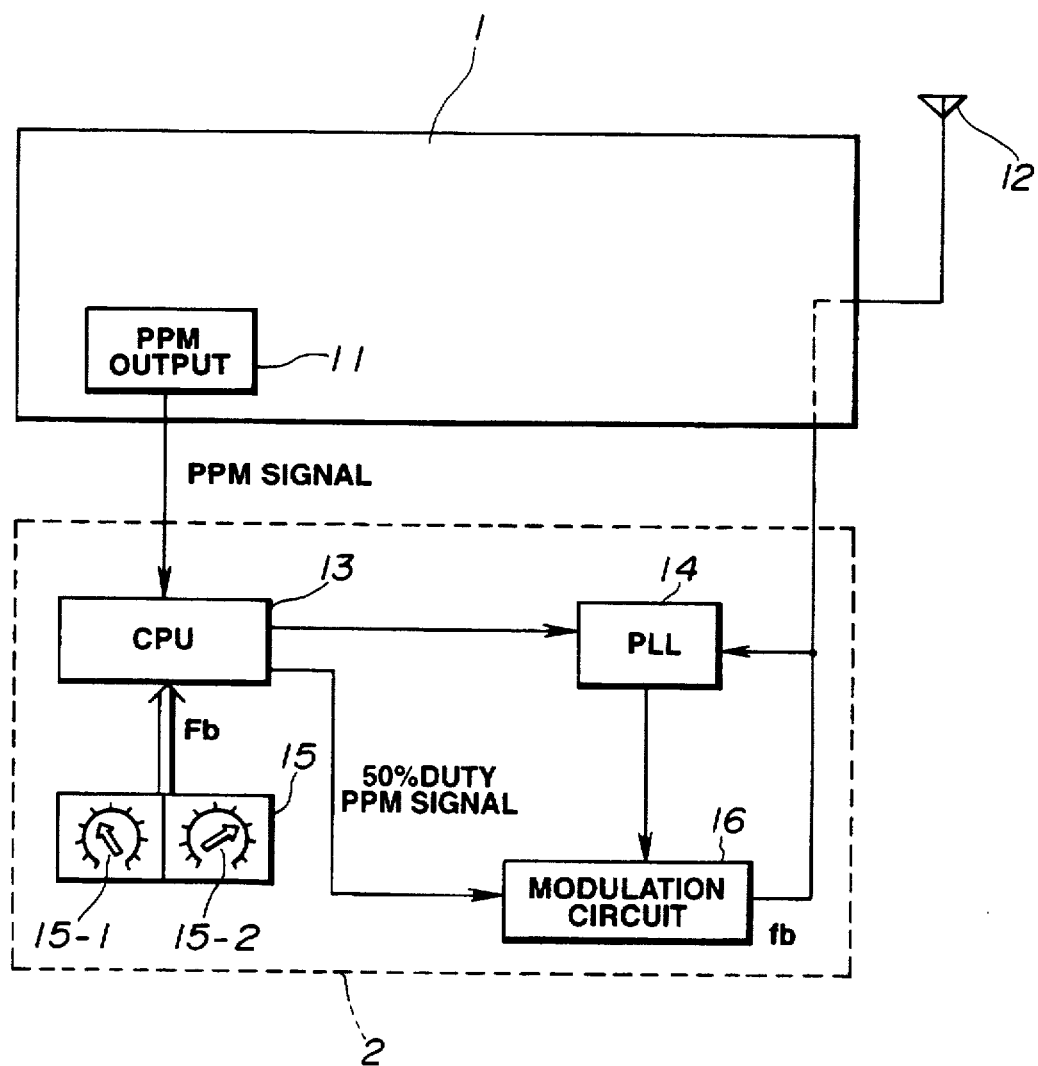
FIG. 1 is a block diagram showing an essential part of a radio control transmitter to which a PLL-mode radiofrequency module according to the present invention is applied.
Figure 2:
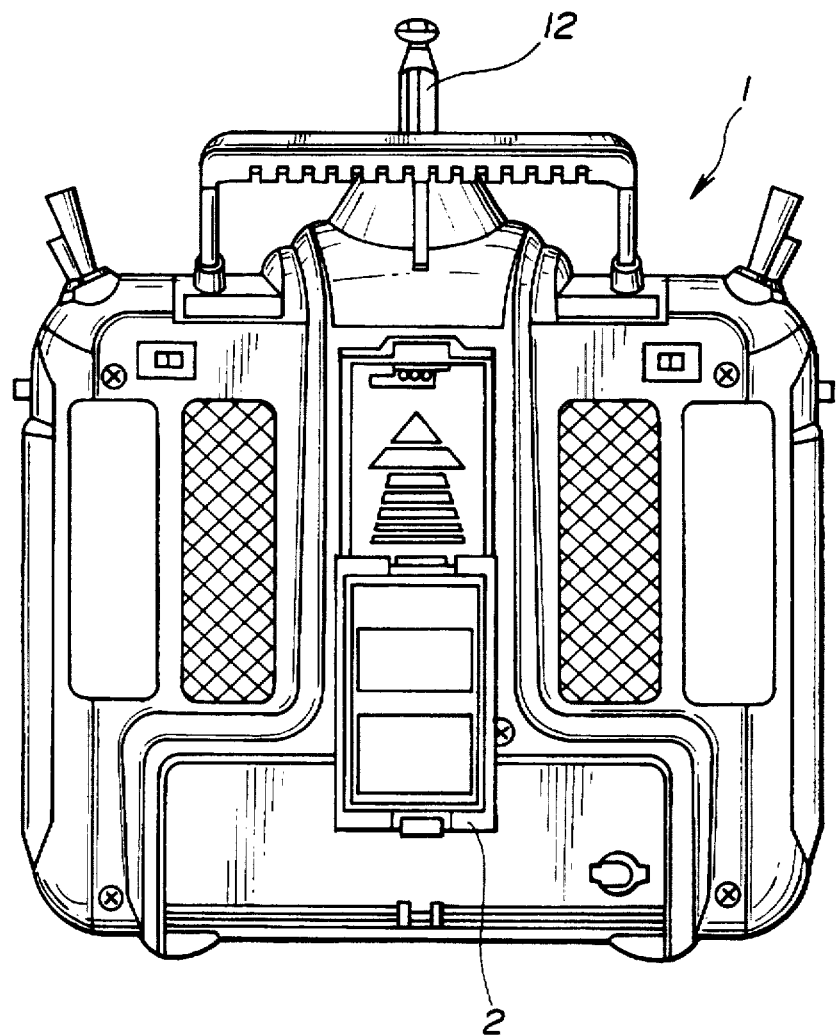
FIG. 2 is a front elevation view of a conventional radio control transmitter showing relationship between a transmitter body and a radiofrequency module.
Figure 3A:
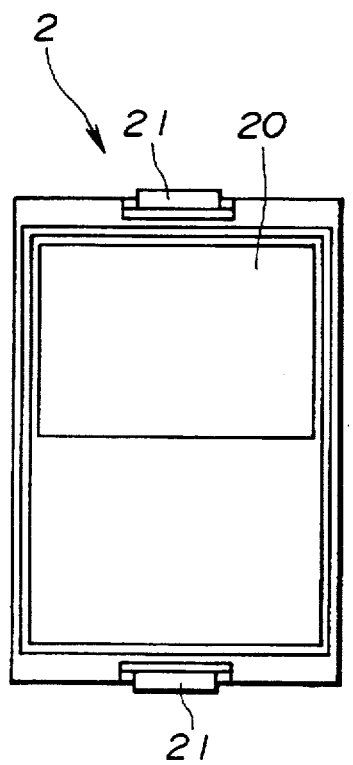
FIG. 3(a) is a schematic front elevation view showing a crystal-mode radiofrequency module.
Figure 3B:
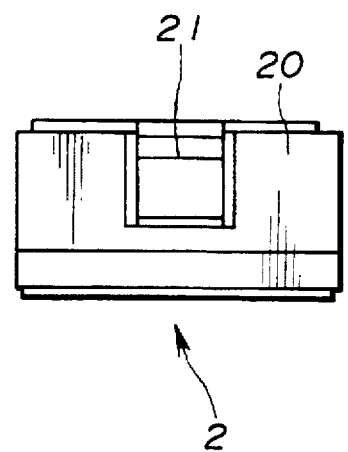
FIG. 3(b) is a schematic bottom view of the crystal-mode radiofrequency module shown in FIG. 3(a)

Referring first to FIG. 1, an essential part of a radio control transmitter to which an embodiment of a PLL-mode radiofrequency module according to the present invention is applied is illustrated.

In FIG. 1, reference numeral 1 designates a transmitter body provided with a control element such as a stick or the like and 2 is a PLL-mode radiofrequency module adapted to be detachably mounted on the transmitter body 1. 11 is a PPM signal output circuit for feeding the PLL-mode radiofrequency module 2 with a PPM signal comprising a plurality of channel pulses subjected to PPM modulation depending on the amount of operation of the control element. 12 is a rod-type antenna and 13 is a microprocessor (CPU) arranged on the PLL-mode radiofrequency module 2 to set frequency information with respect to a PLL oscillator and vary a pulse duty ratio of a PPM signal to about 50%. 14 is a PLL circuit including a frequency divider, a reference oscillator, a phase comparator and a low-pass filter and 15 is a rotary switch for indicating a frequency of a carrier oscillated by the PLL oscillator. 16 is a modulation circuit comprising a voltage control oscillator subjected to FSK modulation by means of a PPM signal applied thereto.

In the radio control transmitter thus constructed, when a power switch of the radio control transmitter is turned on, a frequency indication value Fb set by the rotary switch 15 is recognized by the CPU 13, so that frequency information corresponding to the frequency indication value Fb is fed to the PLL circuit 14, resulting in being set therein. The frequency information fed is set in the frequency divider in the PLL circuit 14, so that a carrier generated from the voltage control oscillator constituting the modulation circuit 16 is divided by the frequency divider. Then, comparison in phase between the carrier and a reference oscillation frequency generated from the reference oscillator arranged on the PLL circuit 3 is carried out by the phase comparator. As a result, the phase comparator outputs a phase comparison signal, which is then subjected to filtering in the low-pass filter and thereafter applied in the form of an error voltage to the modulation circuit 16.

This results in the oscillation frequency of the modulation circuit 16 being controlled, to thereby oscillate a frequency fb indicated by the rotary switch 15.

The PPM signal generated from the PPM signal output circuit 11 arranged in the transmitter body 1 is fed to the CPU 13 as well, so that the CPU 13 varies a pulse duty ratio of the PPM to about 50%. The variation takes place by operation according to the expressions (1) to (4) described above.

The PPM signal of which a pulse duty ratio has been thus varied to about 50% is then fed in the form of a modulation signal from the CPU 13 to the modulation circuit 16.

This causes the modulation circuit 16 to output a carrier subjected to FSK modulation by the PPM signal having a pulse duty ratio varied to about 50%, so that a frequency of the carrier is prevented from being shifted. Thus, the PLL oscillator constituted by the PLL circuit 14 and modulation circuit 16 oscillates a carrier frequency fb subjected to FSK modulation by the PPM signal which coincides with the frequency indication value Fb indicated by the rotary switch 15.

Thereafter, the carrier is fed to the transmitter body 1 and then transmitted from the antenna 12. The transmission may be carried out through an RF amplification circuit for amplifying the carrier.

The rotary switch 15 may comprise a two-digit rotary switch. The rotary switch 15 is so constructed that each of the digits outputs a code such as a BCD code or the like for indicating a frequency. A variation in indication value of a frequency may be carried out by rotating an operation element 15-1 or 15-2 arranged on each of the digits, to thereby vary a value of the code.

Figure 4A:
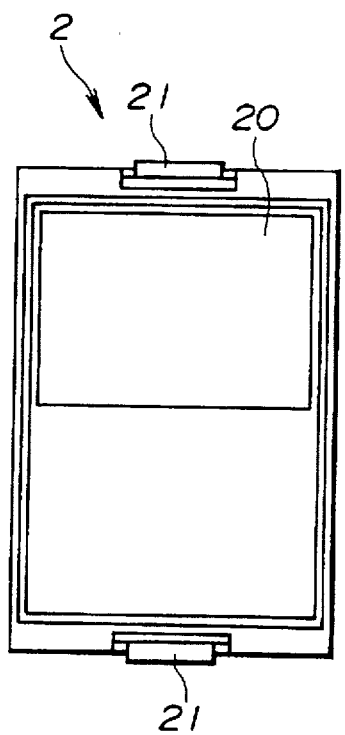
FIG. 4(a) is a schematic front elevation view showing a PLL-mode radiofrequency module.
Figure 4B:
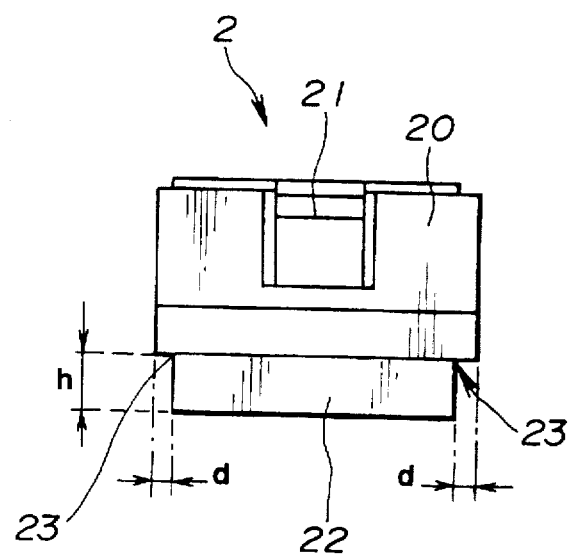
FIG. 4(b) is a schematic bottom view of the PLL-mode radiofrequency module shown in FIG. 4(a)
Figure 5A:
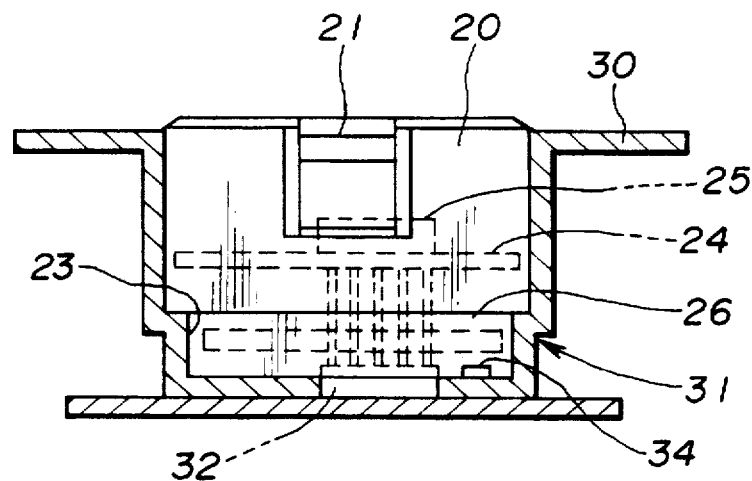
FIG. 5(a) is a side elevation view in section showing a PLL-mode radiofrequency module mounted on a transmitter body.
Figure 5B:
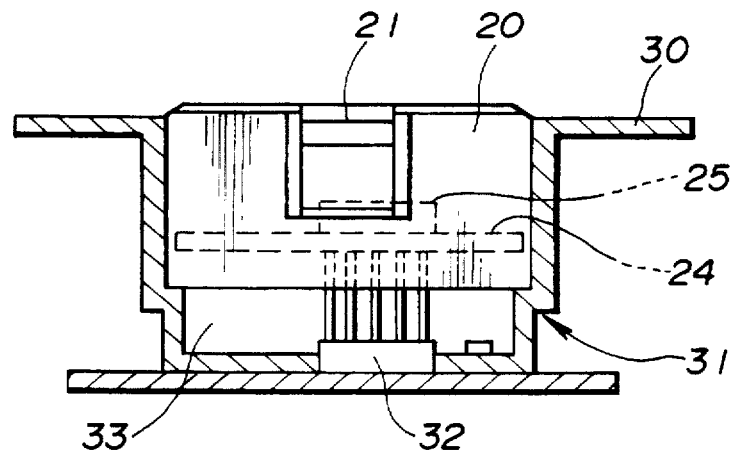
FIG. 5(b) is a side elevation view in section showing a crystal-mode radiofrequency module mounted on a transmitter body.
Figure 6:
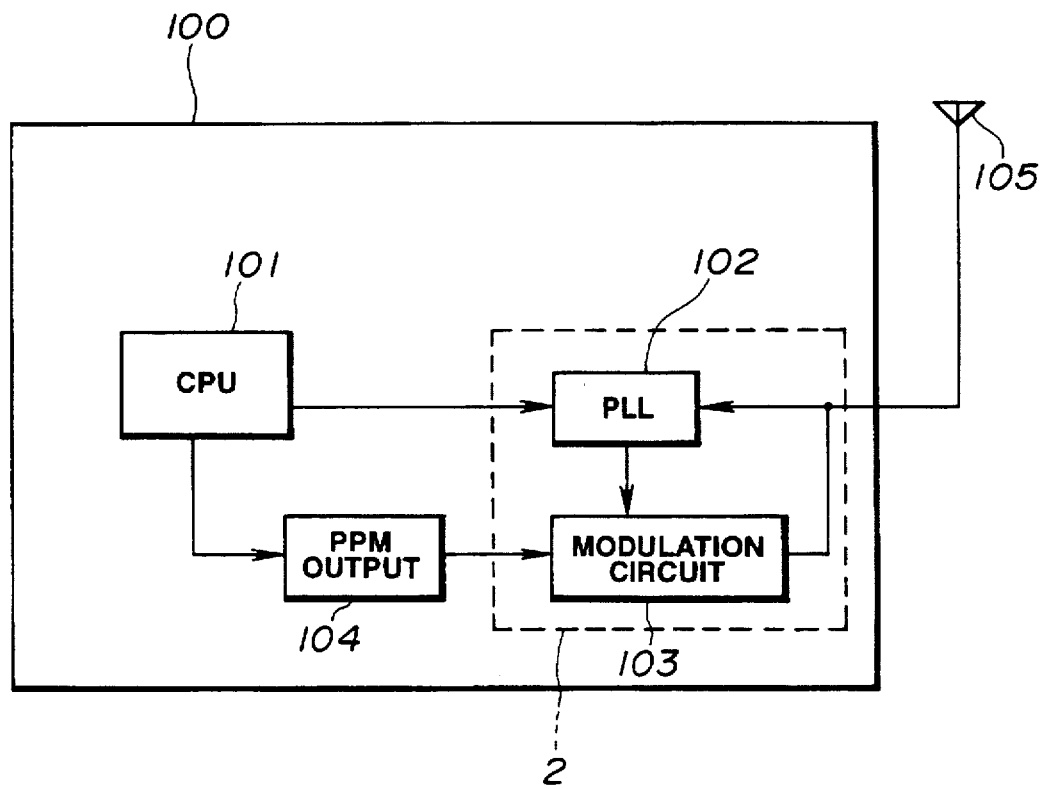
FIG. 6 is a block diagram showing an essential part of a conventional radio control transmitter.
Figure 7:
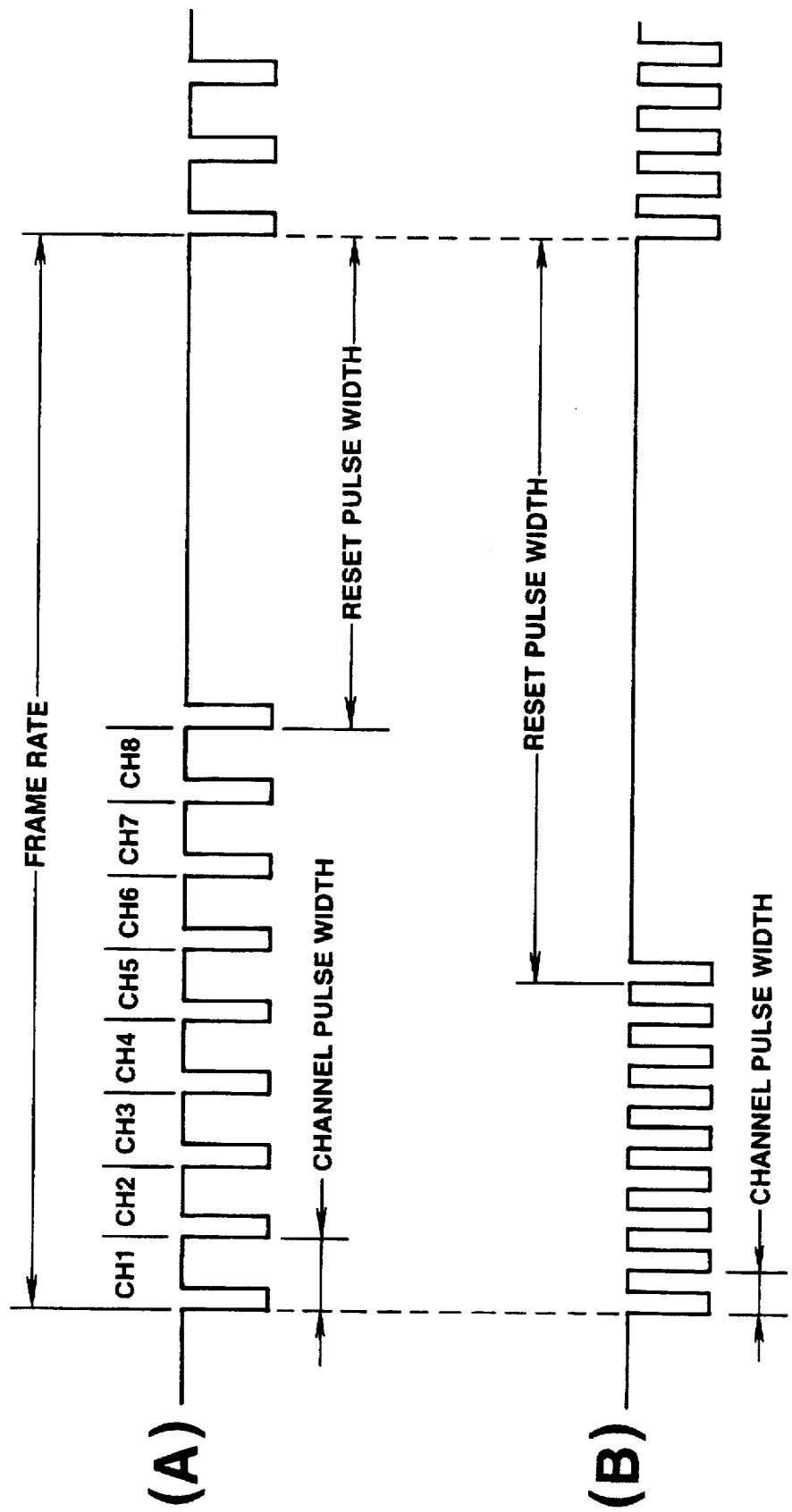
FIG. 7 is a group of pulse waveform diagrams each showing a format of a PPM signal.
Figure 9:
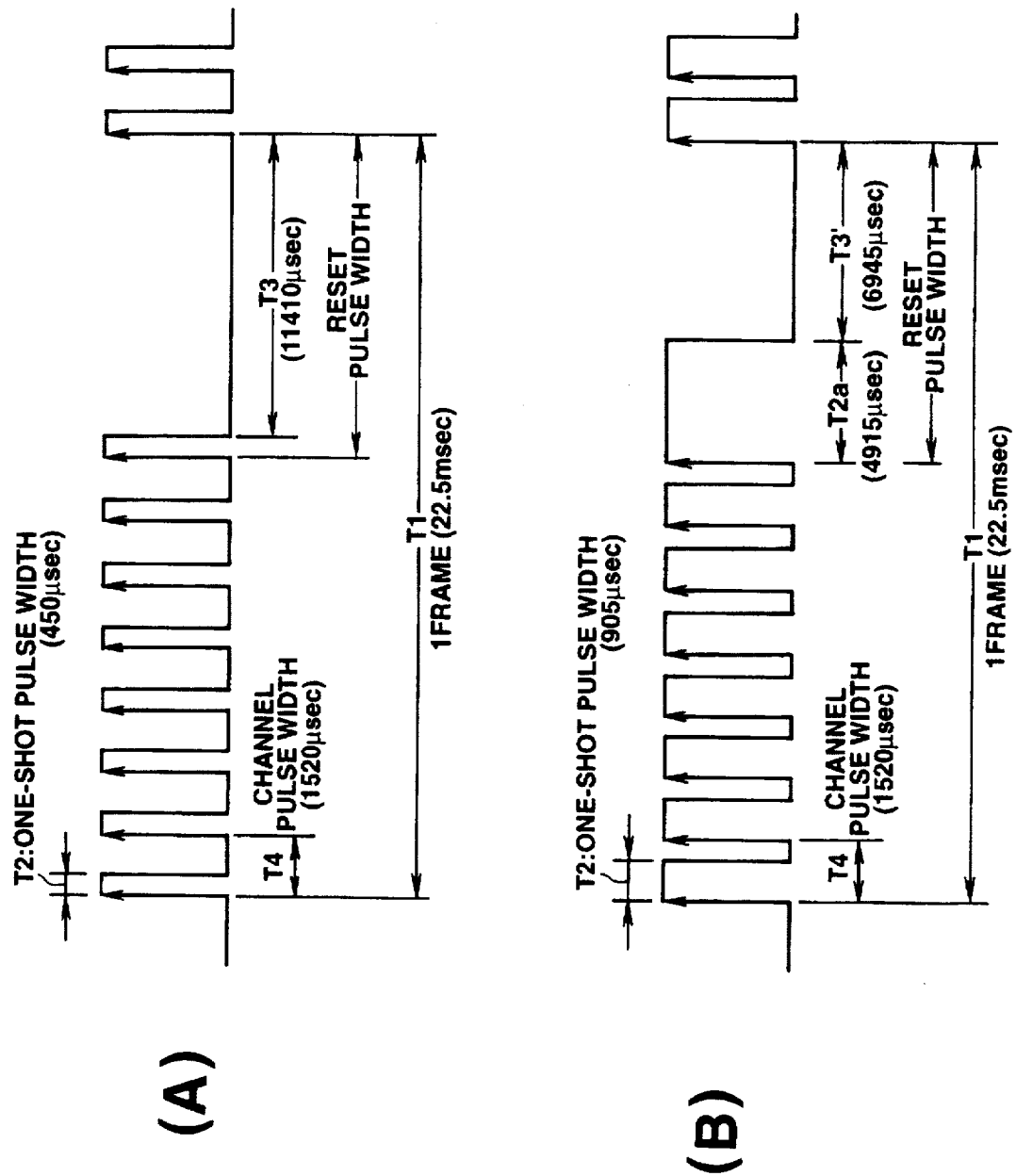
FIG. 9 is a group of pulse waveform diagrams each showing correction of a pulse duty ratio of a PPM signal.
Figure 10:
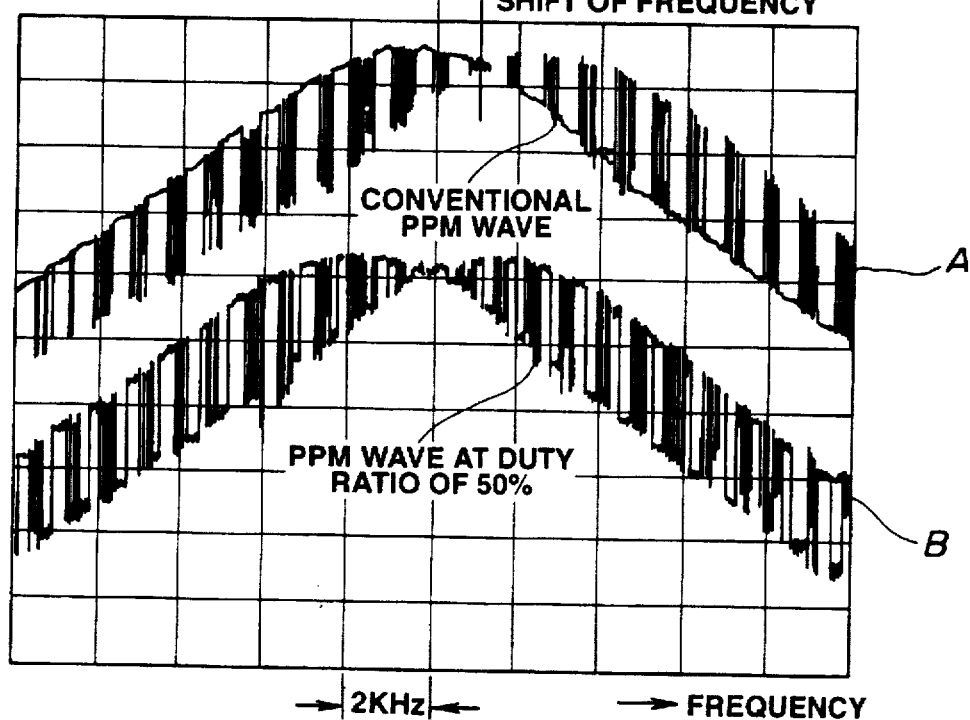
FIG. 10 is a diagrammatic view showing shift of a frequency of a carrier.

The PLL-mode radiofrequency module 2 is constructed into such a configuration as shown in FIGS. 4(a) and 4(b). The rotary switch 15 may be conveniently arranged on a front side of a body of the module. Alternatively, it may be arranged on a rear side thereof as required.

The PLL oscillator is subjected to feedback control, so that lock of the PLL oscillator at a set frequency requires a fixed period of time. Thus, there is likelihood that a carrier of an undesired frequency outputted from the PLL oscillator before it is locked is transmitted from the antenna 12. In order to solve the problem, it is desirable to interrupt a line between the PLL oscillator and the antenna 12 for a predetermined period of time after the power switch is turned on.

As described above, the present invention is so constructed that control for correction of shift of a carrier frequency due to FSK modulation of a PPM signal is carried out on a side of the PLL radiofrequency module 2 rather than the transmitter body 1. Such construction permits the PLL-mode radiofrequency module 2 to be connected to the transmitter body 1 irrespective of arrangement of the microprocessor in the transmitter body 1. Thus, the PLL-mode radiofrequency module of the present invention may be connected to a transmitter of any kind so long as it is provided with a receiving section in which the module is arranged.

The above description has been made in connection with application of the present invention to a radio control transmitter, however, the present invention is not limited to such application. For example, the present invention may be suitably applied to a common transmitter, a citizen band (CB), a transceiver for an amateur radio operator and the like.

As can be seen from the foregoing, the present invention is so constructed that the processing means for controlling a PPM signal so as to vary a pulse duty ratio of the signal to about 50% is arranged on a side of the PLL-mode radiofrequency module. Such construction eliminates a necessity of varying an output waveform of the PPM signal depending on arrangement of the PLL-mode radiofrequency module or crystal-mode radiofrequency module on a side of the transmitter body. This permits a charge to a software of the microprocessor for controlling an output waveform of the PPM signal to be lightened, resulting in the microprocessor satisfactorily exhibiting a function thereof.

Also, the present invention permits the PLL-mode radiofrequency module to be connected to a transmitter body, even when the processing means for controlling a PPM signal so as to permit a pulse duty ratio of the PPM signal to be about 50% is not provided on the transmitter body. Thus, the PLL-mode radiofrequency module can be generally connected to a transmitter of any type.

What is claimed is:

1. A phased locked loop mode radiofrequency module adapted to feed a transmitter body of a transmitter with a frequency shift keyed modulated radiofrequency signal, and adapted to be detachably mounted to the transmitter body, comprising:

a phase locked loop oscillator comprising,
  a phase locked loop circuit for outputting an error voltage signal in response to receiving a frequency information signal and said frequency shift keyed modulated radiofrequency signal;
  modulation means for frequency shift keying a carrier signal as said modulated radiofrequency signal in response to a corrected pulse position modulated signal applied thereto and said error signal from said phase locked loop circuit applied thereto, said modulation means and said phase locked loop circuit connected in a loop-like manner;

frequency indication means for indicating a frequency of said carrier signal oscillated by said phase locked loop oscillator; and processing means for receiving said indication of a frequency from said frequency indication means, providing said frequency information signal to said phase locked loop circuit and for providing said corrected pulse position modulation signal to said modulation means, said corrected pulse position modulation signal being formed from an uncorrected pulse position modulation signal received by said processing means from said transmitter body, said corrected pulse position modulated signal having a duty cycle of about 50%.

2. A PLL-mode radiofrequency module as defined in claim 1, wherein said modulation means comprises a voltage control oscillator.

* * * * *